US009667840B2

(12) United States Patent
Hatasawa

(10) Patent No.: US 9,667,840 B2
(45) Date of Patent: May 30, 2017

(54) VIDEO OUTPUT DEVICE, VIDEO OUTPUT PROGRAM, AND VIDEO OUTPUT METHOD

(71) Applicant: Sony Computer Entertainment Inc., Tokyo (JP)

(72) Inventor: Yasunari Hatasawa, Tokyo (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 295 days.

(21) Appl. No.: 14/503,518

(22) Filed: Oct. 1, 2014

(65) Prior Publication Data

US 2015/0116456 A1     Apr. 30, 2015

(30) Foreign Application Priority Data

Oct. 28, 2013 (JP) .................................. 2013-223614

(51) Int. Cl.
| | |
|---|---|
| *H04N 5/04* | (2006.01) |
| *G06T 1/60* | (2006.01) |
| *H04N 13/00* | (2006.01) |
| *G09G 3/00* | (2006.01) |
| *G09G 5/399* | (2006.01) |

(52) U.S. Cl.
CPC ................ *H04N 5/04* (2013.01); *G06T 1/60* (2013.01); *G09G 3/003* (2013.01); *G09G 5/399* (2013.01); *H04N 13/0048* (2013.01); *H04N 13/0059* (2013.01)

(58) Field of Classification Search
CPC ........... H04N 13/0029; H04N 13/0454; H04N 13/0051; H04N 13/0059; H04N 5/04; H04N 13/0048; G09G 5/399; G09G 3/003; G06T 1/60
See application file for complete search history.

(56) References Cited

U.S. PATENT DOCUMENTS

| | | | | |
|---|---|---|---|---|
| 2010/0045784 | A1* | 2/2010 | Okazaki ............. | H04N 13/0029 348/55 |
| 2011/0187818 | A1* | 8/2011 | Hasegawa .......... | H04N 13/0029 348/42 |
| 2011/0249091 | A1* | 10/2011 | Kishimoto ............. | G09G 5/005 348/43 |
| 2012/0050476 | A1* | 3/2012 | Kawaguchi ........ | G02B 27/2264 348/43 |
| 2013/0229501 | A1* | 9/2013 | Matsumoto ........ | H04N 13/0452 348/54 |

* cited by examiner

*Primary Examiner* — Neil Mikeska
(74) *Attorney, Agent, or Firm* — Katten Muchin Rosenman LLP

(57) ABSTRACT

A video output device includes: a drawing portion drawing successively images corresponding to image information at a first frequency; and an output portion outputting to a three-dimensional television receiver two pieces of image information based on the images corresponding to the image information successively drawn by the drawing portion with the two pieces of image information being packed as first image information and second image information in a form of three-dimensional image information containing therein the first image information and the second image information which are to be transmitted to the three-dimensional television receiver adapted to perform three-dimensional display at a second frequency approximately half of the first frequency.

6 Claims, 12 Drawing Sheets

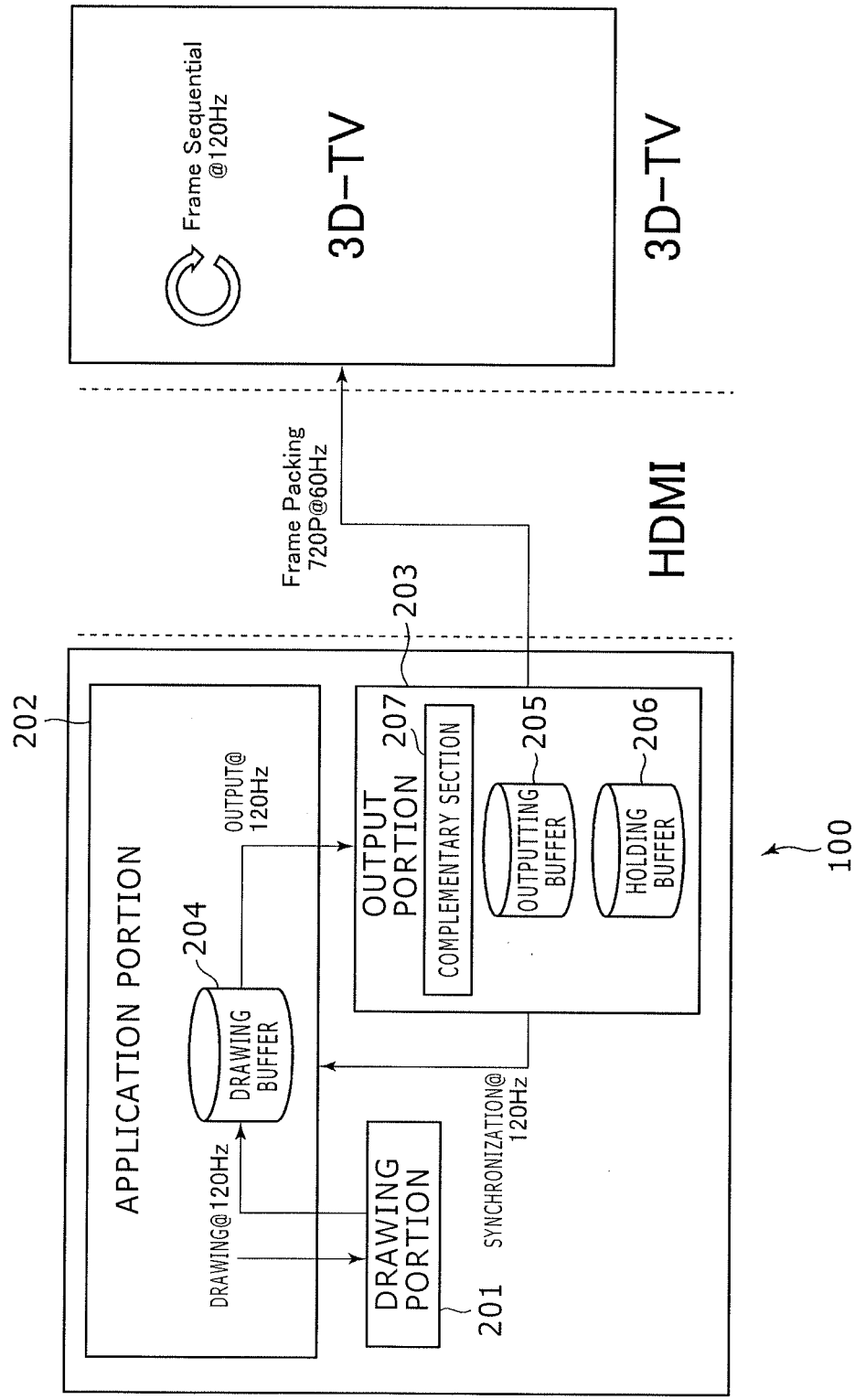

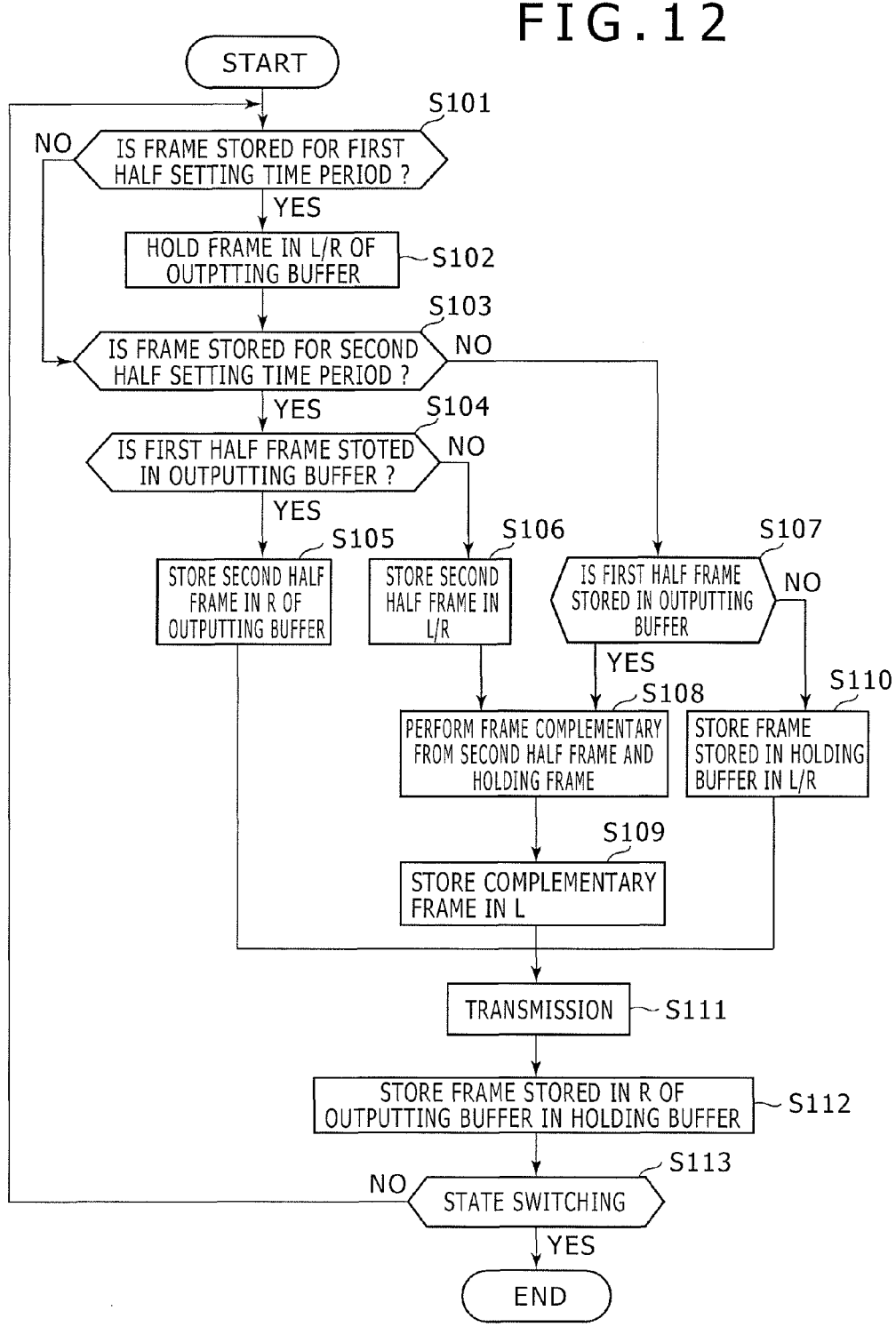

VIDEO OUTPUT DEVICE, VIDEO OUTPUT PROGRAM, AND VIDEO OUTPUT METHOD

BACKGROUND

The present disclosure relates to a video output device, a video output program, and a video output method.

A game program which is designed so as to be driven at 120 Hz is known as a game program which is driven by, for example, a personal computer or the like. When such a game program is executed, the personal computer draws successively game images at 120 Hz. Then, the game images thus drawn is transmitted to a monitor which can display thereon the game images at 120 Hz by using a dedicated cable, and the game images are then displayed on the monitor concerned at 120 Hz.

SUMMARY

In the case as described above, there is required a monitor (for example, a personal computer (PC) monitor) which is connected to the personal computer by using the dedicated cable, and which can display thereon the game image at 120 Hz. For this reason, in general, it may be impossible to display the images of the game program which are driven at 120 Hz on a general television receiver which is not compatible with the 120 Hz-display. In addition, the dedicated cable is necessary with regard to the cable. Thus, for example, it may be impossible to use the general cable such as a cable which is compliant with a High Definition Multimedia Interface (HDMI).

In addition, when the game image is displayed on the PC monitor in the manner as described above, a plurality of viewers are difficult to view the 120 Hz-driven game image to make a play because the PC monitor is generally smaller in size and narrower in angle of field than those of the television receiver described above.

In addition, although it is also expected that the game images are displayed at 120 Hz by increasing the number of frames on a display device side, in this case, it is necessary to add a function of increasing the number of frames to the display device.

The present disclosure has been made in view of the above circumstances, and it is therefore desirable to provide a video output device which is capable of drawing images corresponding to image information on a game program at 120 Hz by, for example, using a three-dimensional display mode of a so-called three-dimensional television displaying at 60 Hz, and displaying the images thus drawn at 120 Hz, a video output program and a video output method which are each used therein.

According to a mode of the present disclosure, there is provided a video output device including: a drawing portion drawing successively images corresponding to image information at a first frequency; and an output portion outputting to a three-dimensional television receiver two pieces of image information based on the images corresponding to the image information successively drawn by the drawing portion with the two pieces of image information being packed as first image information and second image information in a form of three-dimensional image information containing therein the first image information and the second image information which are to be transmitted to the three-dimensional television receiver adapted to perform three-dimensional display at a second frequency approximately half of the first frequency.

According to another mode of the present disclosure, there is provided a program for a computer, comprising: drawing successively images corresponding to image information at a first frequency; and outputting to a three-dimensional television receiver two pieces of image information based on the images corresponding to the image information successively drawn by the drawing portion with the two pieces of image information being packed as first image information and second image information in a form of three-dimensional image information containing therein the first image information and the second image information which are to be transmitted to the three-dimensional television receiver adapted to perform three-dimensional display at a second frequency approximately half of the first frequency.

According to still another mode of the present disclosure, there is provided a video output method including: drawing successively images corresponding to image information at a first frequency; and outputting to a three-dimensional television receiver two pieces of image information based on the images corresponding to the image information successively drawn by the drawing portion with the two pieces of image information being packed as first image information and second image information in a form of three-dimensional image information containing therein the first image information and the second image information which are to be transmitted to the three-dimensional television receiver adapted to perform three-dimensional display at a second frequency approximately half of the first frequency.

BRIEF DESCRIPTION OF THE DRAWINGS

FIG. 2 is a block diagram showing an outline of a functional configuration in the case where the video output device shown in FIG. 1 is connected to a 3D-TV through an HDMI cable;

FIG. 12 is a flow chart explaining a flow of processing in the video output device shown in FIG. 2.

DETAILED DESCRIPTION OF THE PREFERRED EMBODIMENT

Hereinafter, an embodiment of the present disclosure will be described in detail with reference to the accompanying drawings.

Figure 1:
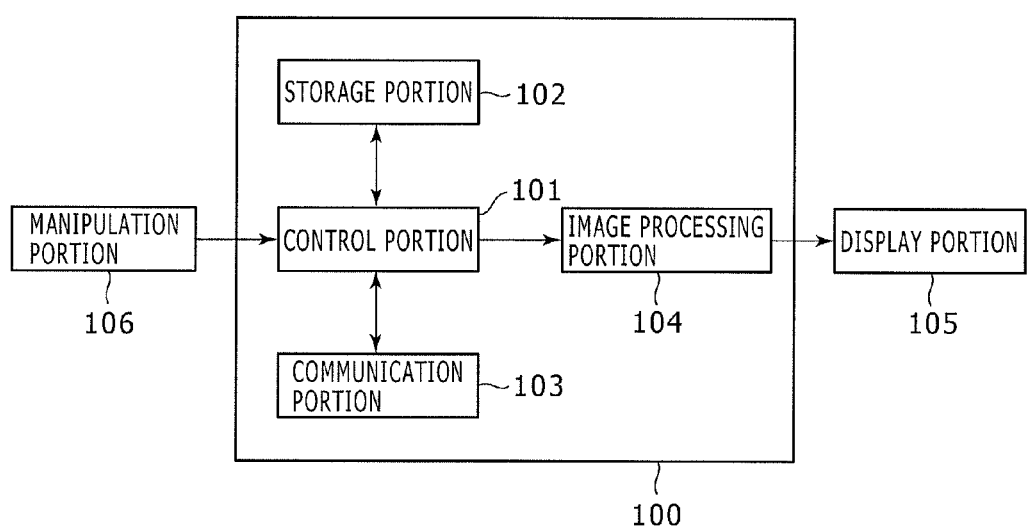
FIG. 1 is a block diagram showing a hardware configuration of a video output device according to an embodiment of the present disclosure.

FIG. 1 is a block diagram explaining a hardware configuration of a video output device 100 according to an embodiment of the present disclosure. As shown in FIG. 1, the video output device 100 includes a control portion 101, a storage portion 102, a communication portion 103, and an image processing portion 104. In addition, the video output device 100 is connected to a display portion 105 and a manipulation portion 106. It is noted that in this embodiment, a description will be given on the assumption that the video output device 100, for example, is a game device which executes a game program, and the display portion 105 is a television receiver for home use which can carry out three-dimensional display (3D-TV). In addition, a description will be given on the assumption that the video output device 100 is connected to the display portion 105 by using a predetermined cable, for example, a so-called High Definition Multimedia Interface (HDMI) (registered trademark).

The control portion 101 includes a program control device such as a central processing unit (CPU), and serves to execute various kinds of pieces of information processing in accordance with a program stored in the storage portion 102. The storage portion 102 includes a memory element such as a random access memory (RAM) or a read-only memory (ROM), and serves to store therein the program which the control portion 101 executes, and data becoming an object of the processing which is executed in accordance with the program. In addition, the storage portion 102 functions also as a work memory in the control portion 101. The communication portion 103 is an interface through which the data is received/transmitted from/to another device or apparatus (not shown) via a network (not shown).

The image processing portion 104, for example, includes a Graphics Processing Unit (GPU) and a memory, and serves to draw an image which is to be displayed on the display portion 105 in accordance with a drawing instruction issued from the control portion 101. Specifically, for example, the GPU writes data on an image to the memory every predetermined time period in accordance with an instruction issued from the control portion 101. Also, the data on the image which has been written to the memory is converted into a video signal at a predetermined timing, and thus the image concerned is displayed on the display portion 105.

The display portion 105 displays thereon the image corresponding to the video signal which has been outputted by the image processing portion 104. Specifically, for example, the display portion 105 displays thereon the image such as the game image which has been created by the game processing which the video output device 100 executes.

The manipulation portion 106 is a device which receives a manipulation input made by a user and, for example, corresponds to a controller. Also, the user inputs various manipulation instructions to the video output device 100 through the manipulation portion 106. It is noted that the hardware configuration shown in FIG. 1 is merely an example, and thus this embodiment is by no means limited to the hardware configuration shown in FIG. 1.

FIG. 2 is a block diagram showing an outline of a functional configuration of the video output device and the like in the case where the video output device of this embodiment is connected to the 3D-TV through the HDMI cable. It is noted that in the following, a description will be mainly given by exemplifying the case where the video output device 100 is driven at 120 Hz, and the image information created at 120 Hz is frame-packed at 720 p and at 60 Hz which are compliant with the HDMI standard. Also, a description will now be given with respect to the case where the image information concerned is transmitted to the 3D-TV through the HDMI cable, and the image corresponding to the image information concerned is displayed on a three-dimensional display mode at 60 Hz in the 3D-TV concerned, thereby being displayed substantially in the two-dimensional manner and at 120 Hz.

As shown in FIG. 2, the video output device 100 functionally includes a drawing portion 201, an application portion 202, and an output portion 203. Here, the application portion 202, for example, corresponds to the control portion 101 described above, and the drawing portion 201 and the output portion 203, for example, correspond to the image processing portion 104 described above.

The drawing portion 201 draws an image in accordance with a drawing instruction issued from the application portion 202. Specifically, for example, as shown in FIG. 2, the drawing portion 201 draws the image in the two-dimensional manner and at 120 Hz in accordance with the instruction issued from the application portion 202, and stores the image information on the image, as a drawing result, in a drawing buffer 204. The image information thus stored is outputted at 120 Hz to the output portion 203 in accordance with the instruction issued from the application portion 202. It is noted that the application portion 202, for example, issues a drawing instruction to the drawing portion 201 in accordance with a manipulation instruction from the user. Here, the manipulation instruction issued from the user, for example, corresponds to pad information corresponding to the input to a pad of a controller corresponding to the manipulation portion 106. Also, when, the game program, for example, is driven at 120 Hz, a configuration may be adopted such that the pad information is acquired so as to correspond to 60 Hz as the drive frequency in the general TV. In this case, for example, a configuration may also be adopted such that the images for two frames are drawn with the same pad information. In addition, when the drive frequency of the game, for example, is 120 Hz, a configuration may also be adopted such that the pad information is acquired either at 120 Hz or at a frequency equal to or larger than a time interval corresponding to 120 Hz. Moreover, a configuration may also be adopted such that the pad information is acquired asynchronously with the drive frequency of the game or the TV, in a word, for example, at a time interval corresponding to a frequency which is higher or lower than 120 Hz. In this case, for example, a configuration is made so as to acquire the pad information which was inputted temporally closest to the present time.

The output portion 203 includes an outputting buffer 205, a holding buffer 206, and a complementary section 207. The outputting buffer 205 stores the image information which has been acquired by the output portion 203 to be stored in the drawing buffer 204 described above in the outputting buffer 205 in a predetermined form which will be described later.

Figure 3A:
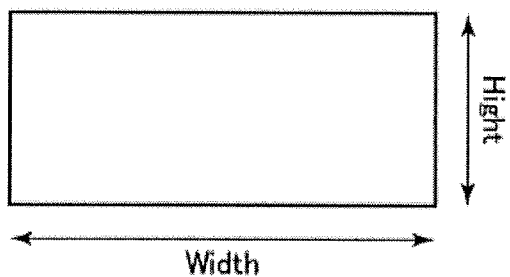
FIG. 3A is a diagram showing an example of a form of a drawing buffer and a holding buffer.

Here, a description is given with respect to an example of memory forms of the drawing buffer 204, the holding buffer 206, and the outputting buffer 205. FIG. 3A schematically shows an example of the memory form of the drawing buffer 204 and the holding buffer 206. Each of the drawing buffer 204 and the holding buffer 206, for example, has a memory area corresponding to the image information for one frame having a predetermined aspect ratio. On the other hand, as shown in FIG. 3B, the outputting buffer 205 has a memory area in which the image information the amount of which is twice as much as that of each of the drawing buffer 204 and the holding buffer 206 can be held.

Figure 3B:
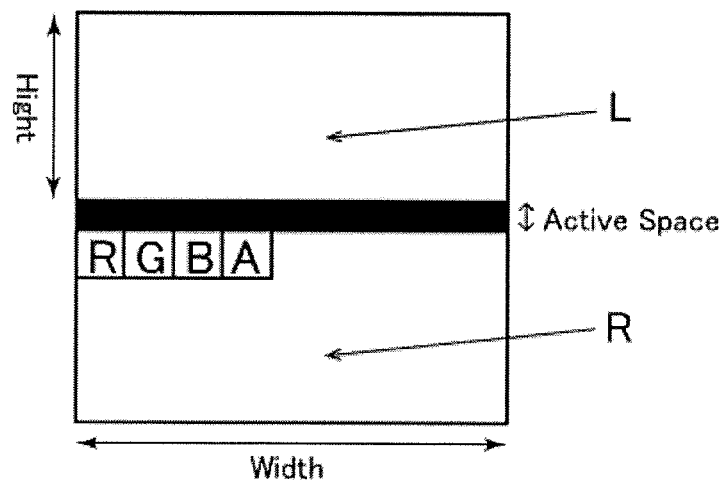
FIG. 3B is a diagram showing an example of a form of an outputting buffer.

Specifically, for example, the outputting buffer 205 stores continuous two frames which have been drawn at 120 Hz in a form in which image information for the left eye (first image information) and image information for the right eye (second image information) are packed in the manner as shown in FIG. 3B at 720 p and at 60 Hz as the three-dimensional format defined by the HDMI standard (1.4a or more) in an area corresponding to the image information for the left eye, and an area corresponding to the image information for the right eye (hereinafter simply referred to as "L" and "R"), respectively. It is noted that an Active Space is contained between L and R.

Also, the output portion 203 outputs the data obtained by the packing to the 3D-TV at 60 Hz through the HDMI cable. In addition, the output portion 203 transmits a vertical synchronous signal of 120 Hz to the application portion 202. Note that, a configuration may also be adopted in such a way that in the transmission of the image information concerned, the fact that the image information concerned corresponds to 720 p and 120 Hz is described in a vendor field defined by the three-dimensional format which is compliant with the HDMI standard.

The complementary section 207, for example, obtains a motion vector between two frames. When there is a motion between the two frames, the complementary section 207 halves an amount of motion to create a complementary frame as a frame between the two frames. Specifically, although in this embodiment, in the predetermined case, the complementary frame is created from both of the frame which is stored in the holding buffer 206 and the frame which is stored in the outputting buffer 205, details thereof will be described later. In addition, although in the predetermined case, the holding buffer 206 holds therein the frame which is stored in R of the outputting buffer 205, details thereof will be described later.

As shown in FIG. 2, the video output device 100 and the 3D-TV are connected to each other through the HDMI cable, and the image information from the video output device 100 is outputted to the 3D-TV through the HDMI cable.

The 3D-TV acquires the image information which has been obtained by the packing in the manner as described above through the HDMI cable, and displays the images corresponding to the two kinds of pieces of image information which are stored in L and R, respectively, in order in the three-dimensional display mode having 60 Hz. Here, for example, in the three-dimensional display mode of the 3D-TV, as described above, in this embodiment, the image information for the two frames which have been driven two-dimensionally at 120 Hz is packed instead of packing the image information for the left eye and the image information for the right eye. Therefore, the images corresponding to the image information for the two frames are successively displayed. As a result, actually, in the 3D-TV, the images corresponding to the image information which has been created by the 120 Hz-driving are successively displayed on the 3D-TV. It is noted that the details of the packing and the like will be described later.

Figure 4:
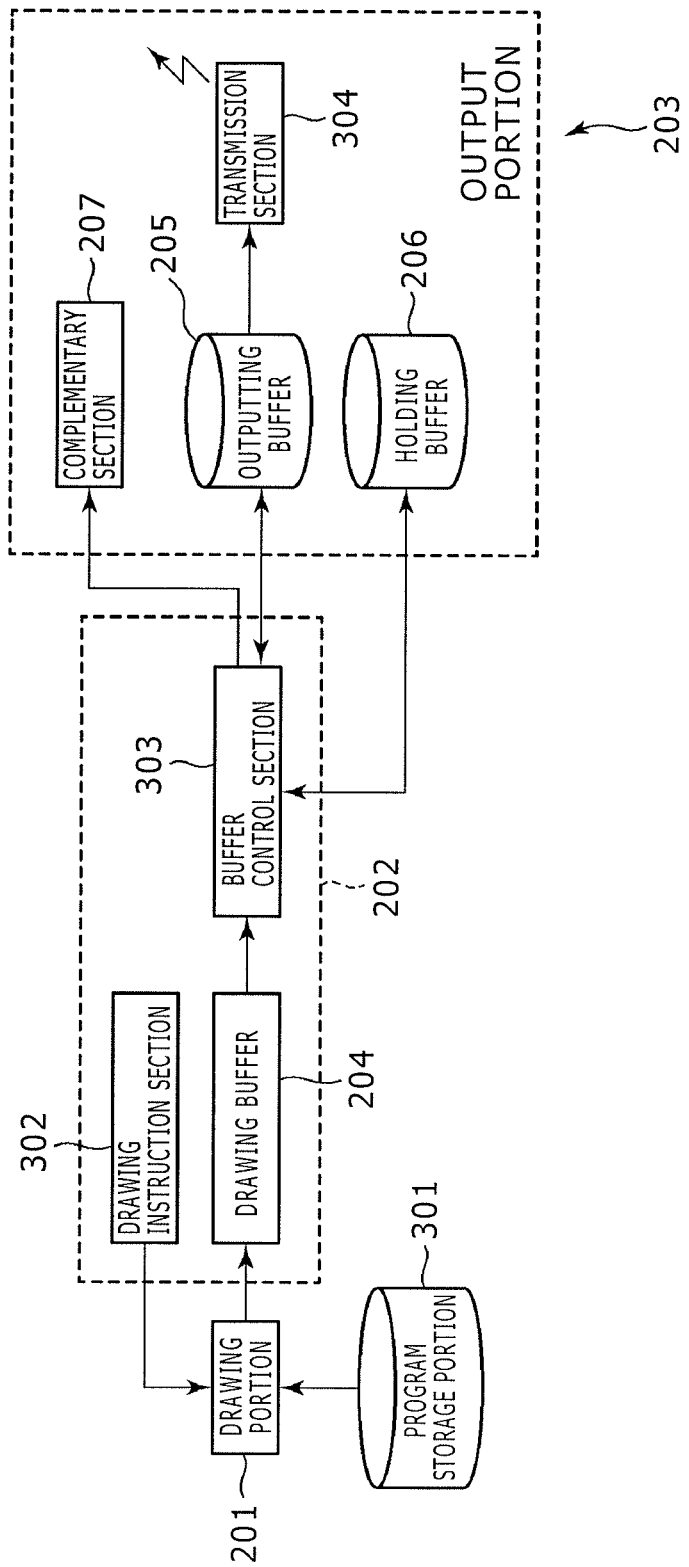
FIG. 4 is a block diagram showing a more concrete functional configuration of the video output device shown in FIG. 2.

Next, a more concrete functional configuration of the video output device 100 shown in FIG. 2 will be described with reference to FIG. 4. As shown in FIG. 4, the video output device 100, for example, functionally includes a program storage portion 301, the application portion 202, and the output portion 203. The application portion 202 includes a drawing instruction section 302, the drawing buffer 204, and a buffer control section 303. In addition, the output portion 203 includes the complementary section 207, the outputting buffer 205, the holding buffer 206, and a transmission section 304.

The program storage portion 301 stores therein an application program. It is noted that the program storage portion 301, for example, corresponds to the storage portion 102.

The drawing instruction section 302, for example, instructs, in accordance with an execution instruction by a user, the drawing portion 201 so that the drawing portion 201 draws the image corresponding to the image information corresponding to a program which the user desires to view. It is noted that the image instruction section 302, as will be described later, instructs the drawing portion 201 in correspondence to the drive state obtained through the switching depending on whether or not the drive state of the video output device 100 has been switched over to another drive state. The drawing buffer 204 stores therein the image information which has been created by the drawing portion 201.

Figure 5:
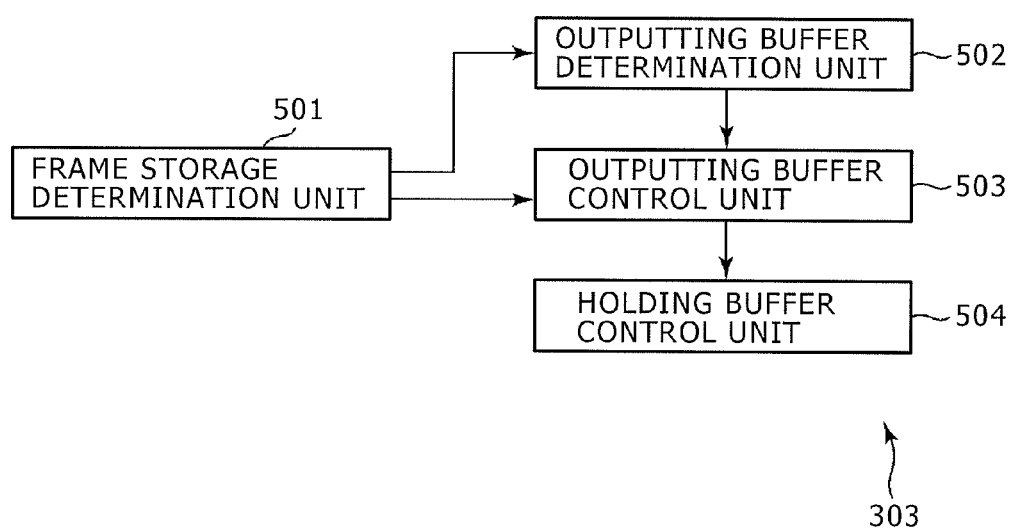
FIG. 5 is a block diagram showing a functional configuration of a buffer control section shown in FIG. 4.

The buffer control section 303 controls the output portion 203. Specifically, for example, as shown in FIG. 5, the buffer control section 303, for example, includes a frame storage determination unit 501, an outputting buffer determination unit 502, an outputting buffer control unit 503, and a holding buffer control unit 504.

Figure 6:
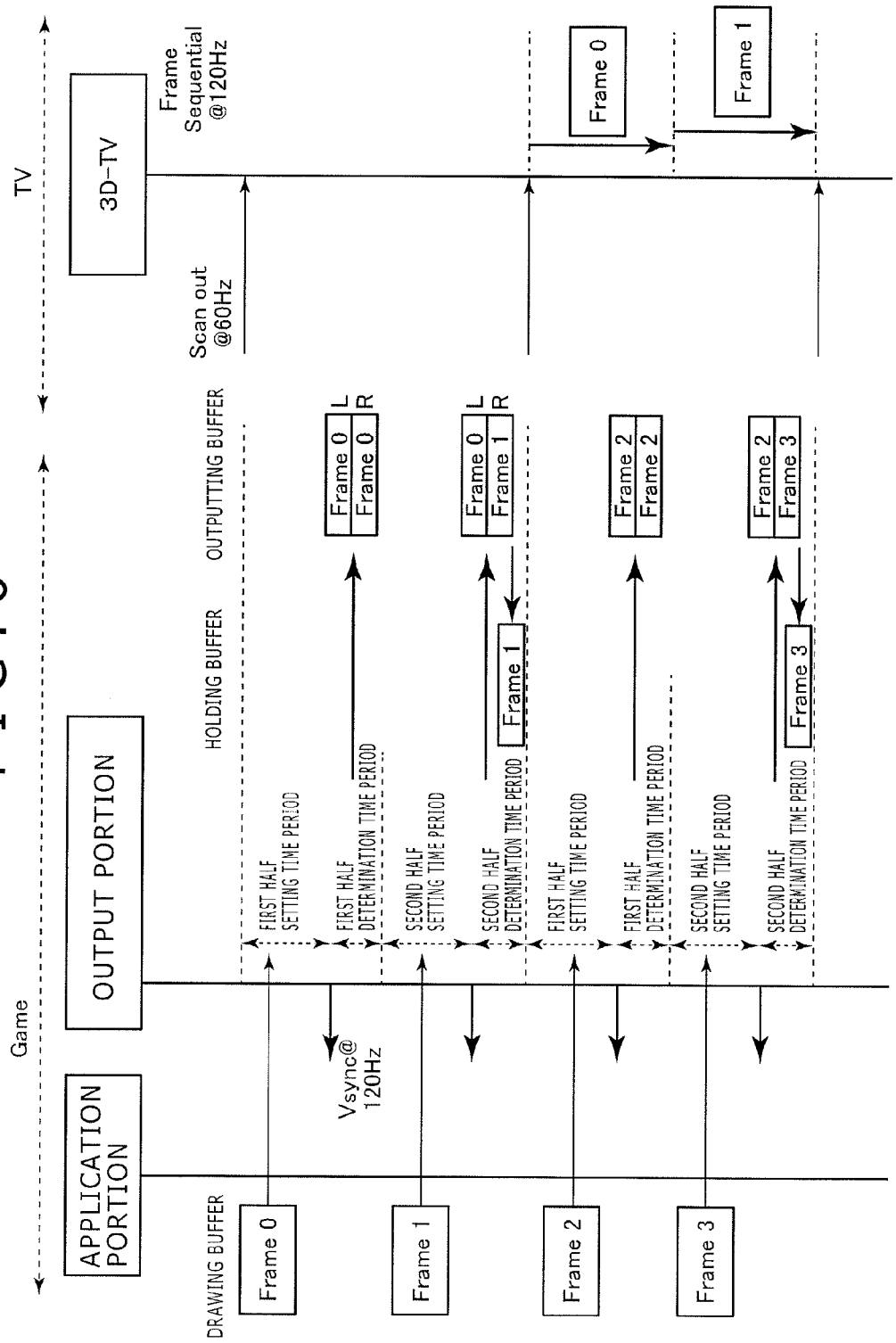
FIG. 6 is a schematic diagram showing a flow of processing in the case of a normal operation of the video output device shown in FIG. 2.

The frame storage determination unit 501 determines whether or not the image information (hereinafter referred to as "the frame") has been stored (set) from the output portion 203 in the drawing buffer 204 every predetermined time period. Specifically, for example, as shown in FIG. 6, about 16.6 ms as each time interval corresponding to 60 Hz at which the output portion 203 outputs the frame to the 3D-TV is divided into two parts. In this case, about 8.3 ms of the first half is set as the time period of the first half, and about 8.3 ms of the second half is set as the time period of the second half. Also, of the time period of the first half, the final about 5% is set as the first half determination time period, and the remaining time period is set as the first half setting time period. Likewise, of the time period of the second half, the final about 5% is set as the second half determination time period, and the remaining time period is set as the second half setting time period. Also, the frame storage determination unit 501 determines whether or not for the first half setting time period and the second half setting time period, the frames have been stored in the drawing buffer 204 in the first half determination time period and the second half determination time period, respectively.

When the frame storage determination unit 501 determines that the frame has been stored for the first half setting time period, the outputting buffer control unit 503 stores the frame which is stored in the drawing buffer 204 in L and R in the outputting buffer 205. Specifically, for example, in the case shown in FIG. 6, since the frame 0 (Frame 0) has been stored in the drawing buffer 204 for the first half setting time period, the outputting buffer control unit 503 stores the frame 0 concerned in L and R of the outputting buffer 205. It is noted that FIG. 6 is a schematic diagram schematically representing states of the buffers 204, 205, and 206, and flows thereof in the case where the video output device 100 in this embodiment is normally operated. In addition, the normally operating of the video output device 100 corresponds to the case where, for example, none of frame defect and the like is caused, and thus the frames are successively stored in the drawing buffer 204 every time interval corresponding to 120 Hz.

When the frame storage determination unit 501 determines that the frame has been acquired for the second half setting time period corresponding to the corresponding first half setting time period, the outputting buffer determination unit 502 determines whether or not the first half frame (the frame which is stored for the first half setting time period) has been stored in the outputting buffer 205. Also, when the outputting buffer determination unit 502 determines that the first half frame has been stored in the outputting buffer 205, the outputting buffer control unit 503 stores the second half frame (the frame which is stored for the second half setting time period) in R of the outputting buffer 205.

Specifically, for example, in the case shown in FIG. 6, a frame 1 is stored in the drawing buffer 204 for the second half setting time period. Therefore, the frame storage determination unit 501 determines that the frame is stored in the drawing buffer 204 for the second half setting time period. Also, the outputting buffer control unit 503 stores the frame 1 in R of the outputting buffer 205 instead of storing the frame 0. It is noted that in FIG. 6, an upper area of the outputting buffer 205 corresponds to L, and a lower area of the outputting buffer 205 corresponds to R.

Figure 7:
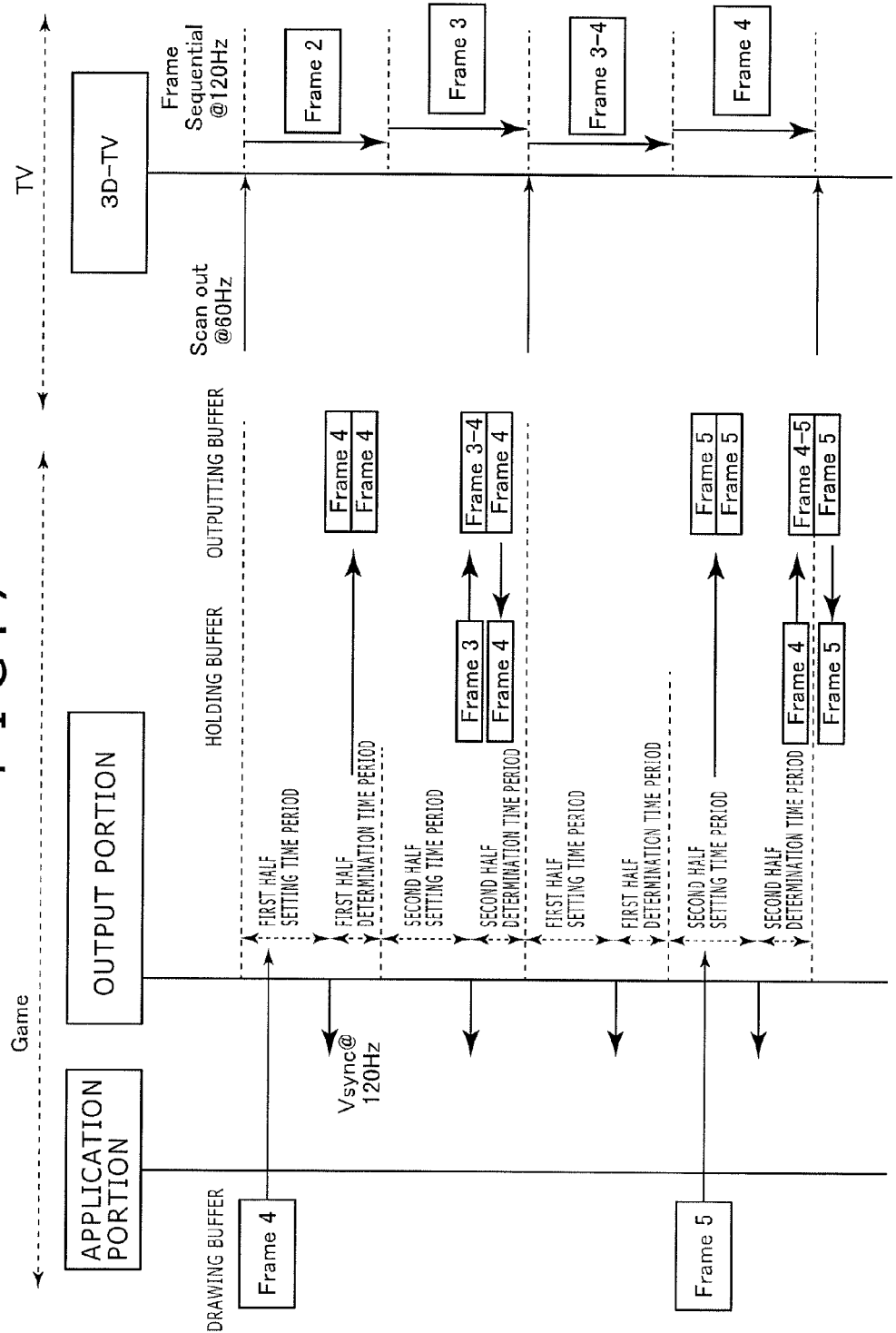
FIG. 7 is a schematic diagram showing a flow of processing in the case where a frame defect is caused in time periods of a first half and a second half in the video output device shown in FIG. 2.
Figure 8:
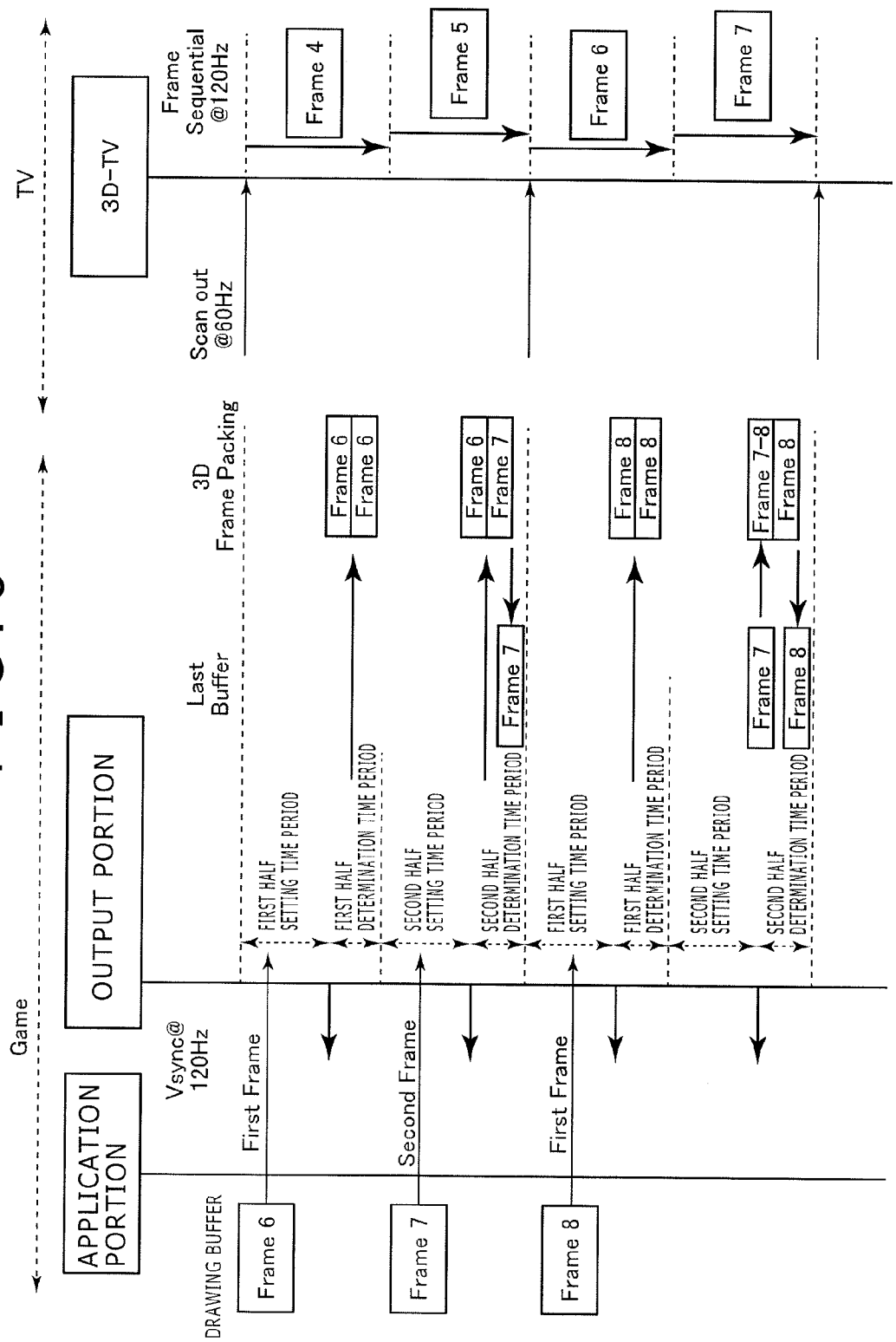
FIG. 8 is a schematic diagram showing a flow of processing in the case where a drive frequency in the drawing is changed from 120 Hz to 60 Hz in the video output device shown in FIG. 2.

When the frame storage determination unit 501 determines that the first half frame is not stored in the outputting buffer 205 for the corresponding first half setting time period, the outputting buffer control unit 503 stores the second half frame in L and R of the outputting buffer 205. Specifically, for example, no first half frame is stored for the first half setting time period shown in the lower side of FIG. 7. Therefore, the outputting buffer control unit 503 stores a frame 5 which is stored in the drawing buffer 204 in L and R of the outputting buffer 205 for the corresponding second half setting time period. Here, FIG. 7 shows a schematic diagram of a flow in the case where the defect is caused in the frame for either the first or second half time period, and thus the frame concerned is not stored in the drawing buffer 204. Other points are the same as those in FIG. 6.

When the frame storage determination unit 501 determines that the frame is not stored in the drawing buffer 204 for the second half determination time period, the outputting buffer determination unit 502 determines whether or not the first half frame has been stored in the outputting buffer 205. Also, when the outputting buffer determination unit 502 determines that the first half frame has been stored in the outputting buffer 205, the complementary section 207 creates a complementary frame from both of the first half frame concerned and the holding frame as the frame stored in the holding buffer 206. Also, the outputting buffer control unit 503 stores the complementary frame thus created in L of the outputting buffer 205. It is noted that a timing at which the holding buffer 206 stores therein the holding frame, and the like will be described later.

Figure 9:
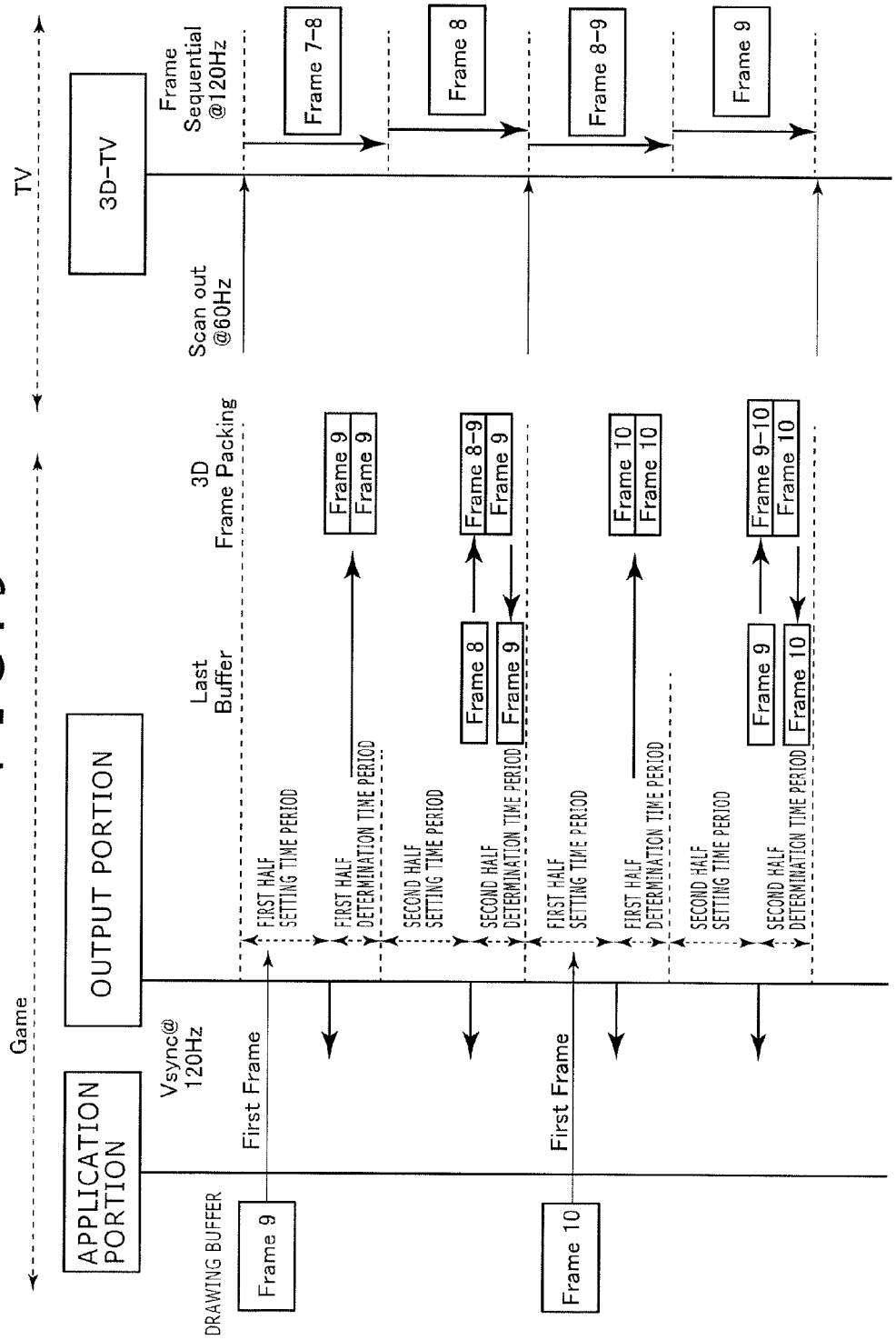
FIG. 9 is a schematic diagram showing an example of a flow of processing after the drive frequency in the drawing is changed to 60 Hz in the video output device shown in FIG. 2.
Figure 10:
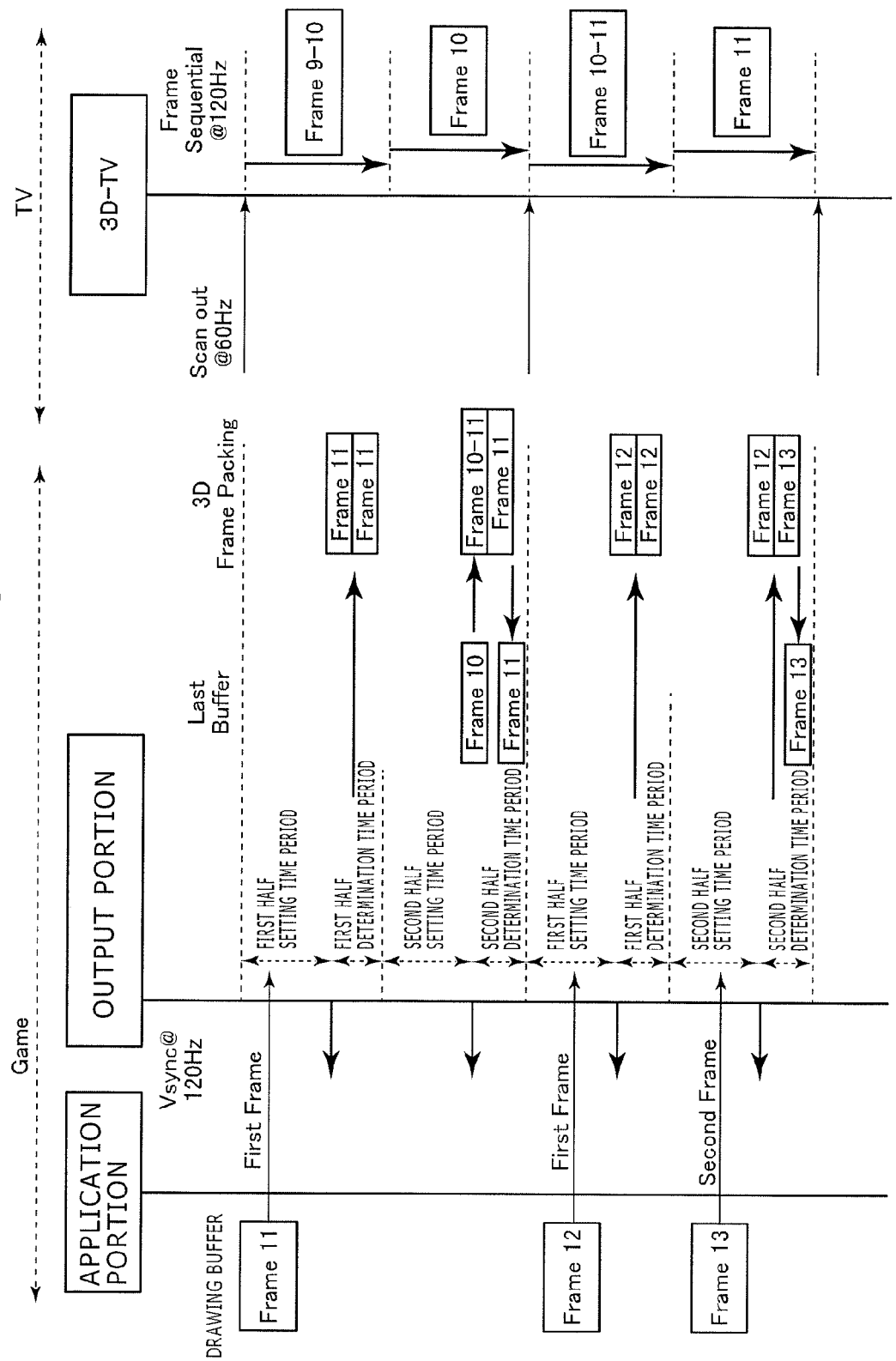
FIG. 10 is a schematic diagram showing an example of a flow of processing in the case where a drive frequency in the drawing is changed from 60 Hz to 120 Hz in the video output device shown in FIG. 2.

Specifically, for example, in the case shown on the upper side of FIG. 7, although the frame 4 is stored in the drawing buffer 204 for the first half setting time period, but the frame 5 as the frame next to the frame 4 is not stored in the drawing buffer 204 for the second half setting time period corresponding to the first half setting time period concerned. Therefore, the frame storage determination unit 501 determines that for the second half determination time period, no frame is not stored in the drawing buffer 204. In this case, the frame 4 as the first half frame is stored in the outputting buffer 205. Therefore, the complementary section 207 creates a complementary frame (Frame 3-4 in the figure) based on both of the frame 4 as the first half frame and the frame 3 which is stored in the holding buffer 206. The complementary frame is then stored in L of the outputting buffer 205. It is noted that this also applies to the case where the driving state of the video output device 100 transits from the 120 Hz-driving state to the 60 Hz-driving state. Specifically, the complementary section 207 creates a complementary frame (Frame 7-8 in the figure) based on both of a frame 8 as the first half frame and a frame 7 which is held in the holding buffer 206. Also, the same processing, as shown in FIG. 9, is repetitively executed during the 60 Hz-driving. Next, when the drawing state of the video output device 100 transits from the 60 Hz-driving state to the 120 Hz-driving state again, as shown in FIG. 10, the same processing as that in the case shown in FIG. 6 is repetitively executed.

Figure 11:
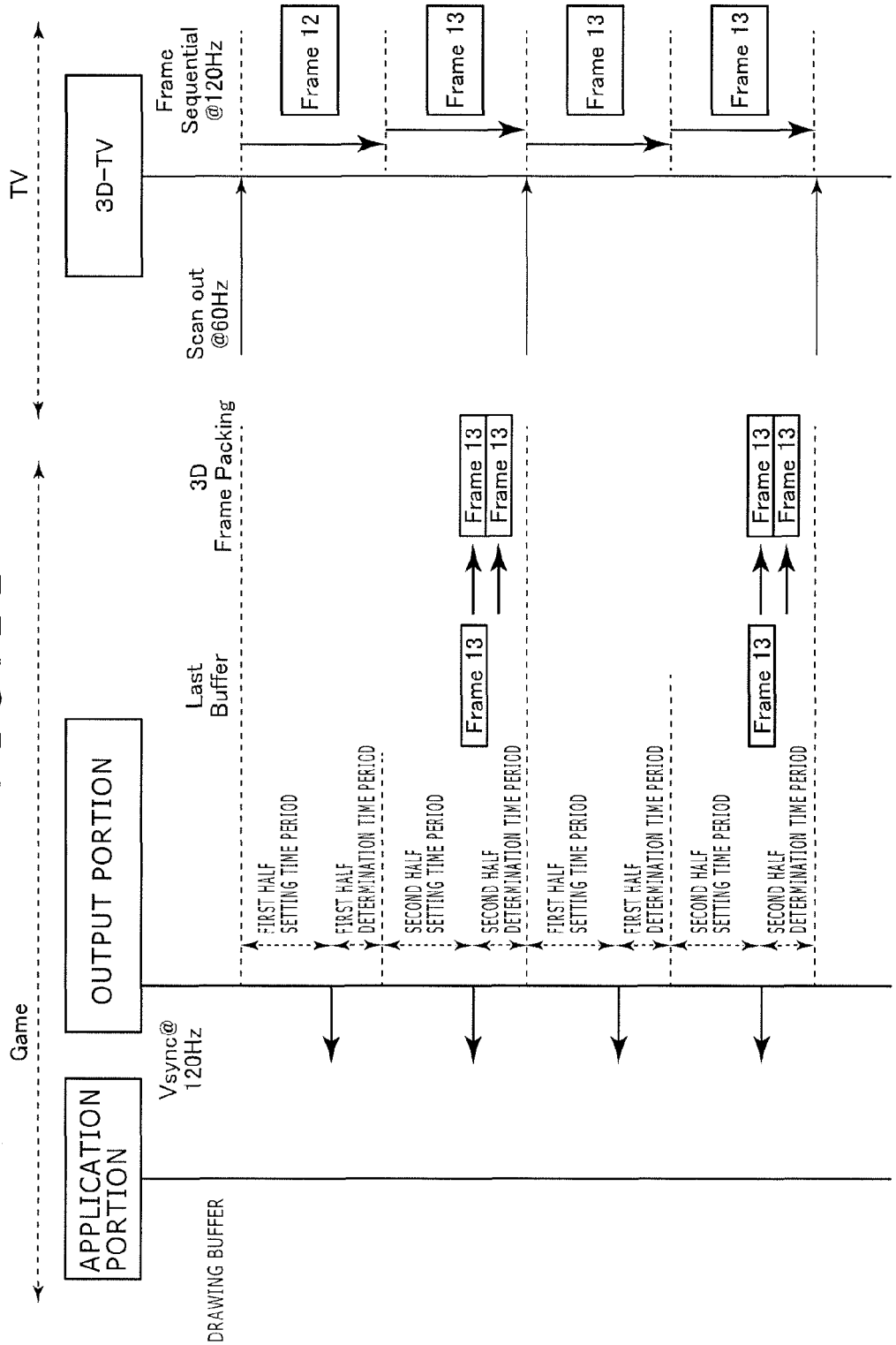
FIG. 11 is a schematic diagram showing an example of a flow of processing in the case where no frame is set in the drawing buffer in the video output device shown in FIG. 2.

On the other hand, when the outputting buffer determination unit 502 determines that no first half frame is not yet stored in the outputting buffer 205 because no frame is stored in the drawing buffer 204 for the second half setting time period, the outputting buffer control unit 503 stores the frame which is stored in the holding buffer 206 in L and R of the outputting buffer 205. Specifically, for example, as shown in FIG. 11, when no frame is stored in the drawing buffer 204, no first half frame is stored in the outputting buffer 205, and no frame is stored in the drawing buffer 204 for the second half setting time period. Therefore, the buffer control section 303 stores a frame 13 which is stored in the holding buffer 206 in L and R of the outputting buffer 205.

The transmission section 304, for example, as shown in FIGS. 6 to 11, transmits the frame which is stored in the outputting buffer 205 to the 3D—TV at a time interval corresponding to the 60 Hz-driving through the HDMI cable. Specifically, for example, the transmission section 304 transmits the image information which is stored in the outputting buffer 205 to the 3D-TV after a lapse of each second half determination time period. Here, the image information for two frames which is stored in the outputting buffer 205, as shown in FIG. 3B, is packed in a predetermined form. Therefore, the frames which have been packed at 60 Hz are displayed on the 3D-TV in the 60 Hz-driving three-dimensional display mode, thereby making it possible to display the frames at 120 Hz.

After the storage of the frames in the outputting buffer 205 by the outputting buffer control unit 503 for the second half determination time period, the holding buffer control unit 504 stores the frame which is stored in R of the outputting buffer 205 in the holding buffer 206. It is noted that since no holding frame is stored in the holding buffer 205 in the phase of start of the flow of the processing, for example, a predetermined holding frame is set in advance.

FIG. 12 is a flow chart explaining a flow of processing executed in the video output device of this embodiment. Specifically, in the following, the flow of the processing when the drawing state of the video output device 100 is switched from other driving state such as the three-dimensional driving state at 60 Hz over to the two-dimensional driving state at 120 Hz will be described as an example.

The frame storage determination unit 501 determines whether or not the frame is stored in the drawing buffer 204 for the first half setting time period (S101). When the frame storage determination unit 501 determines that the frame is stored in the drawing buffer 204 for the first half setting time period (Yes in S101), the outputting buffer control unit 503 stores the frame which is stored in the drawing buffer 204 in L and R of the outputting buffer 205 (S102). For example, in the case shown in FIG. 6, since the frame 0 is stored for the first half setting time period, the outputting buffer control unit 503 stores the frame 0 in L and R of the outputting buffer 205. The frame storage determination unit 501 determines whether or not the frame is stored in the drawing buffer 204 for the second half setting time period (S103).

When the frame storage determination unit 501 determines that the frame is stored in the drawing buffer 204 for the second half setting time period (Yes in S103), the outputting buffer determination unit 502 determines whether or not the first half frame is stored in the outputting buffer 205 (S104).

When the outputting buffer control unit 503 determines that the frame is stored in the outputting buffer 205 (Yes in S104), the outputting buffer control unit 503 stores the second half frame in R of the outputting buffer 205 (S105). Also, the operation proceeds to processing in S111 which will be described later. For example, in the case shown in FIG. 6, the frame 1 is stored in the drawing buffer 204 for the second half setting time period, and the frame 0 is stored in the outputting buffer 205. Therefore, the outputting buffer control unit 503 stores the frame 1 which is stored in the drawing buffer 204 in R of the outputting buffer 205 for the second half setting time period.

On the other hand, when the outputting buffer control unit 503 determines that no first half frame is stored in the outputting buffer 205 (No in S104), the outputting buffer control unit 503 stores the second half frame in L and R of the outputting buffer 205 (S106). For example, as shown on the lower side of FIG. 7, since no first half frame is stored in the outputting buffer 205, the outputting buffer control unit 503 stores the frame 5 as the second half frame in L and R of the outputting buffer 205. Then, the operation proceeds to processing in S108 which will be described later.

When the frame storage determination unit 501 determines in S103 that no second half frame is stored in the drawing buffer 204 for the second half setting time period (No in S103), the outputting buffer determination unit 502 determines whether or not the first half frame is stored in the outputting buffer 205 (S107).

When the outputting buffer determination unit 502 determines that the first half frame is stored in the outputting buffer 205 (Yes in S107), the complementary section 207 creates a complementary frame from both of the first half frame concerned and the holding frame which is stored in the holding buffer 206 (S108). For example, as shown on the upper side pf FIG. 7, no second half frame is stored in the drawing buffer 204 for the second half setting time period, and the first half frame (the frame 4) is stored in the outputting buffer 205. Therefore, the complementary section 207 creates the frame 3-4 from both of the frame 4 and the frame 3 which is stored in the holding buffer 206.

The outputting buffer control unit 503 stores the complementary frame concerned in L of the outputting buffer 205 (S109). Then, the operation proceeds to the processing in S111 which will be described later.

When the outputting buffer determination unit 502 determines in S107 that no first half frame is stored in the outputting buffer 205 (No in S107), the outputting buffer control unit 503 stores the frame which is stored in the holding buffer 206 in L and R of the outputting buffer 205 (S110). Then, the operation proceeds to the processing in S111 which will be described later. For example, in the case shown in FIG. 11, no drawing buffer 204 is stored in the drawing buffer 204 for the second half setting time period, and also no first half frame is stored in the outputting buffer 205. Therefore, the outputting buffer control unit 503 stores the frame 13 which is stored in the holding buffer 206 in L and R of the outputting buffer 205.

The transmission section 304 transmits the frame which is stored in the outputting buffer 205 to the 3D-TV (S111). Then, the 3D-TV successively displays thereon the frames which are stored in the outputting buffer 205 in the three-dimensional display mode at 60 Hz.

The frame which is stored in R of the outputting buffer 205 is stored in the holding buffer 206.

It is determined whether or not the driving state of the video output device 100 is switched from the 120 Hz-diving state over to other driving state (for example, the two-dimensional 60 Hz-driving state, or the like) (S113). When it is determined in S113 that the driving state of the video output device 100 is not switched from the 120 Hz-diving state over to other driving state (No in S113), the operation is returned back to the processing in S101. On the other hand, when it is determined in S113 that the driving state of the video output device 100 is switched from the 120 Hz-diving state over to other driving state (Yes in S113), the operation is ended. It is noted that presence or absence of the switching concerned, for example, may be carried out by the instruction manipulation made by the user. In addition, for example, in those instances where a moving image which is driven at 60 Hz is contained in a part of the game program which is driven at 120 Hz, a configuration may also be adopted such that the image display device 100 determines the switching described above in accordance with the timing at which the moving image concerned is created.

In the video output device according to this embodiment of the present disclosure, the video output device and the general television receiver which can carry out the three-dimensional display are connected to each other by, for example, using the HDMI cable, whereby the image of the game which is driven at 120 Hz can be displayed at 120 Hz on the general television receiver which can carry out the three-dimensional display. Since the television receiver as described above is generally larger in size than the monitor for the PC, a plurality of viewers can readily enjoy the game which is driven at 120 Hz. In addition, the display can be carried out at 120 Hz by using the general television receiver which does not include a function with which the display is carried out at 120 Hz, and which can carry out the three-dimensional display. Therefore, it is unnecessary to purchase the dedicated cable compatible with the game program which is driven at 120 Hz or the dedicated monitor. In addition, for example, in those instances where the two-dimensional moving image which is driven at 60 Hz is present within the game, the frame complementary makes it possible to create the frames the number of which corresponds to driving in the two-dimensional manner and at 120 Hz.

The present disclosure is by no means limited to the embodiment described above, and the embodiment may be replaced with the constitution which is substantially the same as that shown in the embodiment, the constitution which offers the same operation and effect as those in the embodiment, or the constitution with which the same object as that of the embodiment can be attained. For example, in the foregoing, the description has been mainly given with respect to the case where the video output device 100, the 3D-TV, and the cable through which the video output device 100 and the 3D-TV are connected to each other are compliant with the HDMI standard. However, the present disclosure may also be applied to the case where the video output device 100, the 3D-TV, and the cable through which the video output device 100 and the 3D-TV are connected to each other are compliant with any other suitable standard similar to the HDMI standard. In addition, for example, in the flow chart shown in FIG. 12, the order of the processing in S111 and the processing in S112 may be simultaneously executed or may be reversed. Thus, any other suitable flow may be adopted in this embodiment as long as a flow which is substantially the same as that shown in FIG. 12, a flow which offers the same operation and effect as those of the flow shown in FIG. 12, or the same object as that of the flow shown in FIG. 12 can be attained. In addition, in the embodiment described above, the description has been given with respect to the case where the 3D-TV is of the display system which is the so-called field sequential system. However, there may be provided a system determination portion for determining whether the 3D-TV connected through the HDMI cable is of the field sequential system described above, or of other system such as the so-called passive system. In this case, when it is determined that the 3D-TV connected through the HDMI cable is not of other system, but is of the field sequential system, the video output device 100 may be configured in such a way that it executes the processing as described above in which, for example, the image information on the images drawn at 120 Hz is packed to be transmitted to the 3D-TV.

In addition, the present disclosure is by no means limited to the embodiment described above, and various modified changes can be made. Specifically, a configuration may also be adopted such that when the driving state is switched over to another one in the video output device 100, for example, the three-dimensional mode at 60 Hz and the two-dimensional mode at 120 Hz do not directly transit. For example, a configuration may also be adopted such that when in the video output device, the three-dimensional display mode at 60 Hz or the two-dimensional display mode at 120 Hz, which are carried out in the three-dimensional television receiver, is switched over to the two-dimensional display mode at 120 Hz or the three-dimensional display mode at 60 Hz, which are carried out in the three-dimensional television receiver, the switching is carried out via the two-dimensional display mode at 60 Hz. As a result, for example, the user who views the normal three-dimensional image can be urged to take off his/her three-dimensional glasses. Thus, it is possible to prevent the user from suffering the physiologic shock when he/she views the image which is not displayed in the three-dimensional manner with the three-dimensional glasses.

The present technology contains subject matter related to that disclosed in Japanese Priority Patent Application JP 2013-223614 filed in the Japan Patent Office on Oct. 28, 2013, the entire content of which is hereby incorporated by reference.

What is claimed is:

1. A video output device, comprising:
   a drawing portion drawing successively images corresponding to image information at a first frequency; and
   an output portion outputting to a three-dimensional television receiver two pieces of image information based on the images corresponding to the image information successively drawn by said drawing portion with the two pieces of image information being packed as first image information and second image information in a form of three-dimensional image information containing therein the first image information and the second image information which are to be transmitted to the three-dimensional television receiver adapted to perform three-dimensional display at a second frequency approximately half of the first frequency;
   a drawing buffer successively storing therein image information on the images which are drawn by said drawing portion,
   wherein said output portion includes:
      an outputting buffer including first and second areas corresponding to the first image information and the second image information, respectively, and
      a transmitting section transmitting the second image information which is stored in said outputting buffer to said three-dimensional television receiver every time period corresponding to the second frequency;
   a frame storage determination unit determining whether or not the image information is stored in said drawing buffer for a first time period corresponding to a first half time period corresponding to the second frequency, and for a second time period corresponding to a second half time period corresponding to the second frequency, wherein said outputting buffer stores therein the image information on the images which are successively drawn in accordance with a determination result made by said frame storage determination unit,
   wherein said output portion further includes:
      a holding buffer storing therein the image information which is stored in said second area of said outputting buffer, and
      a complementary section creating a complementary frame by (a) calculating a motion vector between the image information which is stored in said holding buffer and the image information which is stored in either said first or second area of said outputting buffer, (b) halving an amount of motion detected in the motion vector to form the complementary frame,
   and, when the image information is not stored in said drawing buffer either for the first time period or for the second time period, said outputting buffer stores the complementary frame in said first area.

2. The video output device according to claim 1, wherein the image information is not stored in said drawing buffer for the first time period and the second time period, said outputting buffer stores the image information which is stored in said holding buffer in said first and second areas.

3. The video output device according to claim 1, wherein the first frequency is 120 Hz, and the second frequency is 60 Hz.

4. The video output device according to claim 1, wherein a form of the three-dimensional image information is a form compliant with a high-definition multimedia interface standard.

5. The video output device according to claim 4, wherein said video output device is connected to said three-dimensional television receiver through a cable compliant with the high-definition multimedia interface standard, and the two pieces of image information thus packed are outputted to said three-dimensional television receiver through said cable.

6. The video output device according to claim 3, wherein when a mode in which display is carried out at 60 Hz in a three-dimensional manner on said three-dimensional television receiver is switched over to a mode in which the display is carried out at 120 Hz in a two-dimensional manner on said three-dimensional television receiver, or a mode in which display is carried out at 120 Hz in the two-dimensional manner on said three-dimensional television receiver is switched over to a mode in which the display is carried out at 60 Hz in the three-dimensional manner on said three-dimensional television receiver, the switching is carried out via a mode in which the display is carried out at 60 Hz in the two-dimensional manner.

* * * * *